(12) United States Patent
Skaff et al.

(10) Patent No.: US 10,421,420 B2
(45) Date of Patent: Sep. 24, 2019

(54) METHODS AND APPARATUS FOR REPORTING STATE OF CHARGE IN ELECTRIC VEHICLES

(75) Inventors: Ryan Skaff, Farmington Hills, MI (US); Derek Hartl, Royal Oak, MI (US); Paul Aldighieri, Grosse Pointe Farms, MI (US); Jeffrey Allen Greenberg, Ann Arbor, MI (US); David L. Watson, Ann Arbor, MI (US); Dale Gilman, Beverly Hills, MI (US); Craig Sandvig, Sterling Hts, MI (US); Leslie Bodnar, Dearborn, MI (US); Leann Kridner, Canton, MI (US); Angela L. Watson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 12/985,470

(22) Filed: Jan. 6, 2011

(65) Prior Publication Data
US 2012/0179311 A1    Jul. 12, 2012

(51) Int. Cl.
*B60R 16/023* (2006.01)
*B60W 30/18* (2012.01)
(Continued)

(52) U.S. Cl.
CPC .......... *B60R 16/0236* (2013.01); *B60L 58/12* (2019.02); *B60R 16/0232* (2013.01);
(Continued)

(58) Field of Classification Search
CPC .. B60L 2250/16; B60L 58/12; B60R 16/0236; B60R 16/0232; B60W 30/18009;
(Continued)

(56) References Cited

U.S. PATENT DOCUMENTS 4,400,779 A * 8/1983 Kosuge et al. ............... 701/123
5,301,113 A * 4/1994 To et al. ...................... 701/123
(Continued)

FOREIGN PATENT DOCUMENTS

CN      101795912 A    8/2010
DE   102010010620 A1    1/2011
(Continued)

OTHER PUBLICATIONS

Chinese Patent Office, Third Office Action for the corresponding Chinese Patent Application No. 201210005397.4 dated May 20, 2016.
(Continued)

*Primary Examiner* — Dale W Hilgendorf
(74) *Attorney, Agent, or Firm* — Frank Lollo; Brooks Kushman P.C.

(57) ABSTRACT

A computer-implemented method of displaying vehicle range includes receiving input corresponding to a level of charge remaining in a vehicle having at least a partial electric power source usable for vehicle locomotion. The method also includes determining a maximum remaining range which the vehicle can travel based at least on the level of charge. The method further includes displaying a maximum range boundary overlaid on a map, including at least an indicator at the center of the range indicating a current location of the vehicle.

8 Claims, 7 Drawing Sheets

(51) Int. Cl.

| | |
|---|---|
| *B60W 50/00* | (2006.01) |
| *B60W 50/14* | (2012.01) |
| *B60L 58/12* | (2019.01) |
| *G07C 5/00* | (2006.01) |
| *H02J 7/00* | (2006.01) |
| B60K 6/445 | (2007.10) |
| G07C 5/04 | (2006.01) |

(52) U.S. Cl.
CPC .. *B60W 30/18009* (2013.01); *B60W 50/0097* (2013.01); *B60W 50/14* (2013.01); *G07C 5/004* (2013.01); *H02J 7/0047* (2013.01); B60K 6/445 (2013.01); B60K 2350/1076 (2013.01); B60K 2370/1534 (2019.05); B60K 2370/169 (2019.05); B60K 2370/1868 (2019.05); B60W 2050/146 (2013.01); B60W 2510/244 (2013.01); B60W 2550/12 (2013.01); B60W 2550/20 (2013.01); B60W 2550/402 (2013.01); G07C 5/04 (2013.01); Y02T 10/6239 (2013.01); Y02T 10/705 (2013.01); Y02T 10/7005 (2013.01); Y02T 10/7044 (2013.01)

(58) Field of Classification Search
CPC ............. B60W 50/14; B60W 50/0097; B60W 2550/402; B60W 2550/20; B60W 2550/12; B60W 2550/244; B60W 2550/146; G07C 5/004; H02J 7/0047; B60K 2370/1868; B60K 2370/1534; B60K 2370/169
USPC ............ 701/123, 527, 423, 22, 29; 320/109
See application file for complete search history.

(56) References Cited

U.S. PATENT DOCUMENTS

| | | | |
|---|---|---|---|
| 5,459,666 A * | 10/1995 | Casper et al. ......... | G01C 23/00 701/123 |
| 5,686,895 A * | 11/1997 | Nakai et al. ........ | B60L 11/1861 340/636.1 |
| 5,734,099 A * | 3/1998 | Saigo et al. ................ | 701/22 |
| 5,739,674 A | 4/1998 | Kawahara et al. | |
| 5,790,976 A | 8/1998 | Boll et al. | |
| 5,913,917 A | 6/1999 | Murphy | |
| 5,916,298 A * | 6/1999 | Krioss et al. ....... | B60R 16/0232 701/123 |
| 6,453,731 B1 * | 9/2002 | Yaegashi ................ | B60K 35/00 73/114.53 |
| 6,636,805 B1 * | 10/2003 | Tada et al. ................. | 701/420 |
| 7,237,203 B1 * | 6/2007 | Kuenzner ............. | B60K 35/00 701/123 |
| 8,362,891 B2 | 1/2013 | Schumann et al. | |
| 2005/0049779 A1 * | 3/2005 | Yasuda et al. ................ | 701/200 |
| 2007/0029121 A1 | 2/2007 | Katsuhiro | |
| 2007/0208468 A1 | 9/2007 | Sankaran et al. | |
| 2008/0133120 A1 * | 6/2008 | Romanick ................... | 701/123 |
| 2009/0040033 A1 * | 2/2009 | Uchida ............... | B60L 11/1861 340/439 |
| 2009/0234599 A1 | 9/2009 | Watanabe | |
| 2010/0094496 A1 * | 4/2010 | Hershkovitz et al. ...... | B60L 11/1861 701/22 |
| 2010/0138098 A1 * | 6/2010 | Takahara et al. ............... | 701/29 |
| 2010/0138142 A1 * | 6/2010 | Pease ........................... | 701/123 |
| 2010/0194553 A1 * | 8/2010 | Mizutani et al. ..... | B60W 50/14 340/438 |
| 2010/0280698 A1 | 11/2010 | Ichikawa | |
| 2011/0112710 A1 * | 5/2011 | Meyer-Ebeling et al. ..... | 701/22 |
| 2011/0313610 A1 * | 12/2011 | Riegelman et al. ............ | 701/29 |
| 2012/0032637 A1 * | 2/2012 | Kotooka et al. .............. | 320/109 |
| 2012/0173134 A1 * | 7/2012 | Gutman ........................ | 701/400 |
| 2012/0187900 A1 * | 7/2012 | Murawaka .................... | 320/106 |

FOREIGN PATENT DOCUMENTS

| | | |
|---|---|---|
| JP | 8106927 A | 4/1996 |
| JP | 8106928 A | 4/1996 |
| JP | 8163705 A | 6/1996 |
| JP | 2001231103 A | 8/2001 |
| JP | 2004254483 A | 9/2004 |
| JP | 2006112932 A2 | 4/2006 |
| JP | 2006115623 A | 4/2006 |
| JP | 2008304423 A | 12/2008 |

OTHER PUBLICATIONS

Chinese Patent Office, Second Office Action for the corresponding Chinese Patent Application No. 201210005397.4, dated Nov. 30, 2015.

* cited by examiner

METHODS AND APPARATUS FOR REPORTING STATE OF CHARGE IN ELECTRIC VEHICLES

TECHNICAL FIELD

The illustrative embodiments generally relate to methods and apparatus for reporting a state of charge in electric vehicles (EVs) and/or hybrid electric vehicles (HEVs).

BACKGROUND

Vehicle manufacturers are consistently turning to alternatives to vehicle fuel over the conventional gasoline engines that have fueled vehicles for almost a century. Several popular modern versions of alternative fuel vehicles include hybrid electric vehicles (HEVs) and electric vehicles (EVs).

In an HEV, a combination of gasoline and battery power are used to fuel a vehicle. It may be the case that gasoline is only used when battery power is depleted, or, alternatively, gasoline may be used at certain points during a trip to help recharge electrical system.

In an EV, the gasoline engine has been completely replaced with an electric engine. All power to the engine comes from an electrical source, which may be "recharged" partially during trips using regenerative systems, such as regenerative braking.

In both HEV and EV systems, the batteries that provide electric power to the vehicle hold a current "state-of-charge." Representable as a percentage of a "full charge," this state of charge is the electric equivalent to a "fuel tank level."

Unlike conventional fuel-based vehicles, however, HEVs and EVs may have the ability to be "refueled" by simply plugging them in to an electrical outlet at a destination. Alternatively, they can be charged at electric refueling stations, although at this time a relatively low (compare to gasoline refueling stations) number of these stations exist.

SUMMARY

In a first illustrative embodiment, a computer-implemented method of displaying vehicle range includes receiving, at a computing system for displaying vehicle range, input corresponding to a level of charge remaining in a vehicle having at least a partial electric power source usable for vehicle locomotion.

In this illustrative embodiment the method also includes determining, using the computing system, and based at least in part on pre-defined fuel usage statistics for the vehicle, a maximum remaining range which the vehicle can travel based at least on the level of charge. The illustrative method further includes displaying on a display associated with the computing system, a maximum range boundary overlaid on a map, including at least an indicator at the center of the range indicating a current location of the vehicle.

In a second illustrative embodiment, a machine readable storage medium stores instructions that, when executed, cause a computing system to perform an illustrative method. This illustrative method includes receiving input corresponding to a level of charge remaining in a vehicle having at least a partial electric power source usable for vehicle locomotion.

This illustrative method also includes determining, based at least in part on pre-defined fuel usage statistics for the vehicle, a maximum remaining range which the vehicle can travel based at least on the level of charge This illustrative method further includes displaying, on a display associated with the computing system, a maximum range boundary overlaid on a map, including at least an indicator at the center of the range indicating a current location of the vehicle.

In a third illustrative embodiment, a computer-implemented method includes using a vehicle computing system (VCS) to determine a charge level remaining in a vehicle battery. The illustrative method also includes using the VCS to determine a maximum range which the vehicle can travel based at least on the determined charge level. The illustrative method further includes using the VCS to display at least a maximum range boundary overlaid on a map, the display including at least an indicator in a range boundary interior, indicating a current vehicle location.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
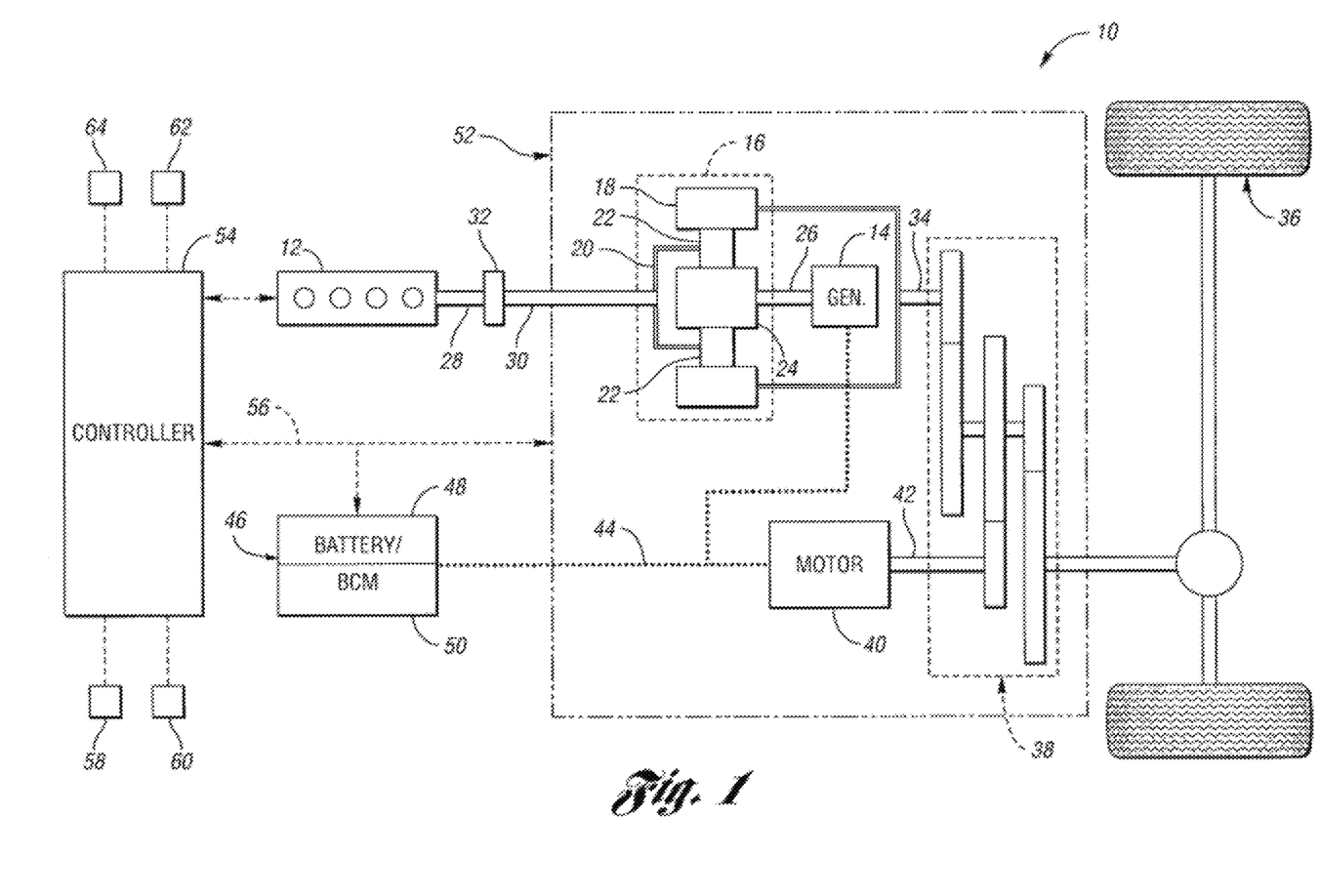
FIG. 1 shows an exemplary schematic of an HEV.

Referring now to the drawings, FIG. 1 is a simplified, exemplary schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement (i.e., the motor 40 and the generator 14) can both be used as motors to output torque. Alternatively, each can also be used as a generator, outputting electrical power to a high voltage bus 44 and to an energy storage system 46, which may include a battery 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as vehicle controller 54, may be provided. Although it is shown as a single controller, it may include multiple controllers that may be used to control multiple vehicle systems. For example, the controller 54 may be a vehicle system controller/powertrain control module (VSC/PCM). In this regard, the PCM portion of the VSC/PCM may be software embedded within the VSC/PCM, or it can be a separate hardware device.

A controller area network (CAN) 56 may allow the controller 54 to communicate with the transmission 52 and the BCM 50. Just as the battery 48 includes a BCM 50, other devices controlled by the controller 54 may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is a HEV, it is understood that embodiments of the present application may be implemented on other types of vehicles, such as those powered by an internal combustion engine alone, electric motor alone or a fuel cell.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, may communicate with the controller 54. The air conditioning system 62 may also communicate with the controller 54. The on/off status of the air conditioning system can be communicated to the controller 54, and can be based on, for example, the status of an operator actuated switch, or the automatic control of the air conditioning system 62 based on related functions such as window defrost.

In addition to the foregoing, the vehicle 10 may include an information display 64, which, as explained in detail below, can provide relevant vehicle content to the driver of the vehicle 10. As shown in FIG. 1, the information display system may include the controller 54 and an information display 64. The information display system 64 may also include its own control system, which, for reference purposes, may be a display control unit. The display control unit may communicate with the controller 54 and may perform control functions on the information display 64, although the controller 54 may also function as the information display's control system. The controller 54 may be configured to receive input that relates to current operating conditions of the vehicle 10, and the controller 54 may provide output to the display control unit such that the information display 64 conveys driving efficiency information or other information relating to the operation of the vehicle 10 to the driver.

The information display 64 may be disposed within a dashboard (not shown) of the vehicle 10, such as in an instrument panel or center console area. Moreover, the information display 64 may be part of another display system, such as a navigation display system, or may be part of a dedicated information display system. The information display 64 may be a liquid crystal display (LCD), a plasma display, an organic light emitting display (OLED), or any other suitable display. The information display 64 may include a touch screen for receiving driver input associated with selected areas of the information display 64. The information display system may also include one or more buttons (not shown), including hard keys or soft keys, located adjacent the information display 64 for effectuating driver input. Other operator inputs known to one of ordinary skill in the art may also be employed without departing from the scope of the present application.

Additionally or alternatively, a remote computing system, such as a PC, a nomadic device (such as, but not limited to, a cellular phone, smart phone, PDA, etc) or other device having a display may be used as an information display. Some or all of the processing of steps associated with illustrative embodiments disclosed herein may occur on the remote computing system as well.

Implementations of illustrative embodiments disclosed herein may be captured in programmed code stored on machine readable storage mediums, such as, but not limited to, computer disks, CDs, DVDs, hard disk drives, programmable memories, flash memories and other temporary or permanent memory sources. Execution of the programmed code may cause an executing processor to perform one or more of the methods described herein in an exemplary manner.

Figures 2, 6:
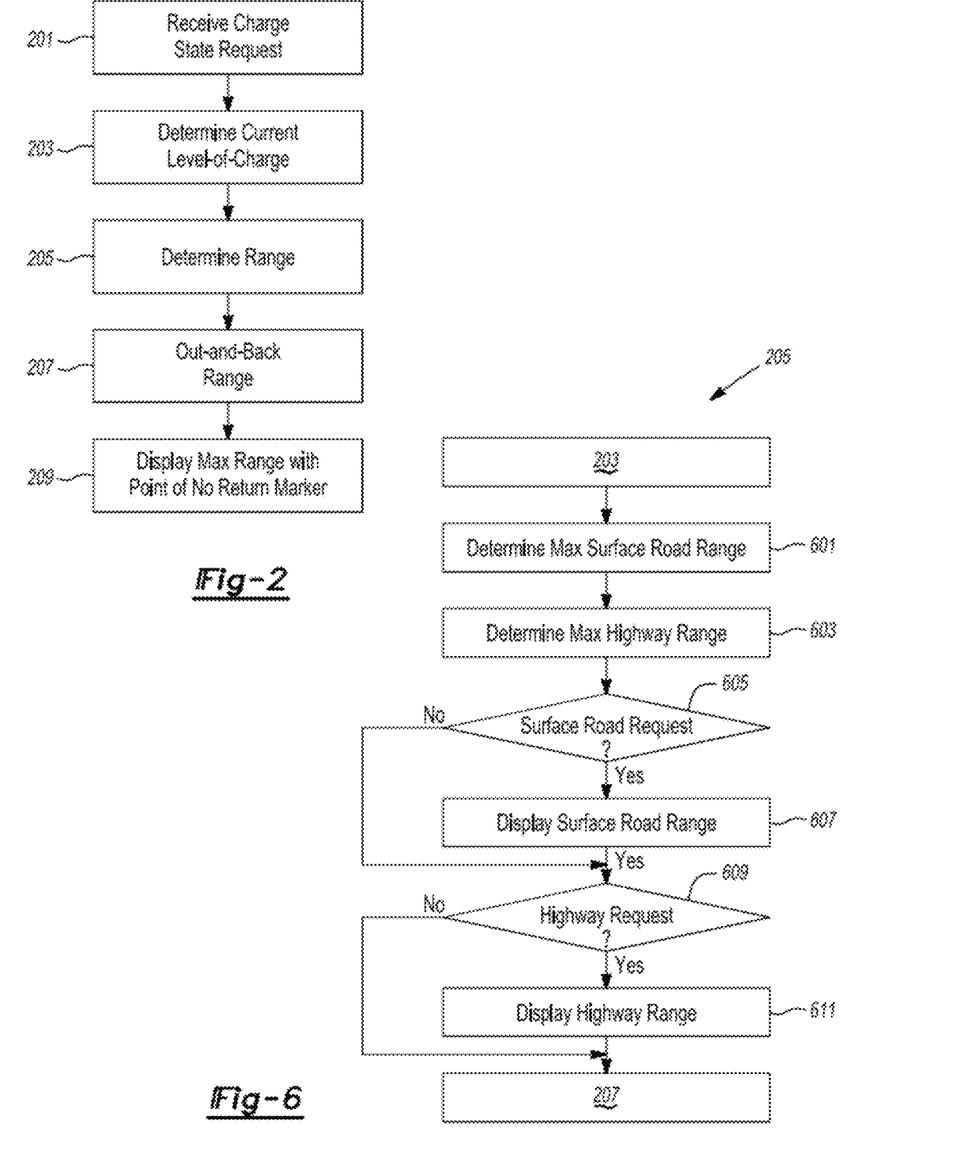
FIG. 2 shows an illustrative example of a process for reporting available vehicle range.
FIG. 6 shows an exemplary determination that takes into consideration what type of driving will exclusively or primarily be performed.

In a first illustrative embodiment, shown in FIG. 2, a charge-display system receives a "charge state" request 201. This charge-display system could be a system available for access on a vehicle navigation display, or it could be a system such as a desktop PC or a nomadic device (such as, but not limited to, a cellular or smart phone).

In response to the charge state request, the receiving display system determines a current level of charge of the vehicle's battery 203 (or other fuel cell, power supplying system, etc.). If the charge-display system is located onboard the vehicle, this determination may be done through a call to a vehicle network, such as, but not limited to, a CAN bus.

If the display system is located remotely from the vehicle, determining the state of charge will likely involve a query of the vehicle itself. This determination could be based on "last known" information saved on a remote source, such as a remote network, or it could result from a real-time communication initiated with the vehicle through a vehicle network connection. In the "real-time communication" instance, the vehicle reports back to the remote source its current level of charge.

Once the current level of charge is known, the charge display system can then calculate an available range for that vehicle 205. In one illustrative embodiment, the calculated range only incorporates available range for electric power (e.g., does not take gasoline levels into account, if the vehicle is a vehicle having both gasoline and electric power). In another illustrative embodiment, a total range for both electric and gasoline (if available) power is calculated.

When the total range is known, an out-and-back range can be easily calculated 207. In a first illustrative embodiment, the calculations for both total range and out-and-back range are relatively simple calculations using a current level-of-charge compared to a set of base performance statistics for a particular vehicle. In more detailed embodiments, a variety of factors including, but not limited to, weather, traffic, speed limits, etc. may be accounted for in determining a maximum range and a maximum "out and back" range.

In at least one illustrative embodiment, several factors may be considered when calculating a distance to empty (DTE). These factors may include, but are not limited to:
- Modifiers/vehicle conditions to resolve known DTE accuracy problems on vehicle power-up, including a strategy to fade these modifiers out over the drive E.g. predicted climate control usage.
- Weighting of historical vehicle operation "window" based on a rough estimate of potential range remaining E.g. if range remaining is low, more weight may be given to the most recent miles driven.
- A strategy to ensure 0 miles to empty is indicated prior to battery energy availability of zero.
- A strategy to handle a power limited battery.
- Electric path DTE system accuracy.
- The maximum DTE may not exceed the running average energy economy multiplied by the advertised usable energy capacity.
- Drive style recognition of mild/moderate/aggressive, etc.
- Adjustments based on route mileage programmed into navigation system.

In this illustrative embodiment, the charge display system then displays a "maximum" range, including a "point of no return marker" 209. This range, of course, assumes that no charge is added to the vehicle along the journey. Instead, in this embodiment, a user is shown, possibly overlain on a map, a total travelable range, and, approximately half-way through that range, a marker where the "point of no return" exists. In more complex display versions, this could be augmented by the presence of known refueling points, the existence of gasoline as alternative fuel, etc.

Figure 3:
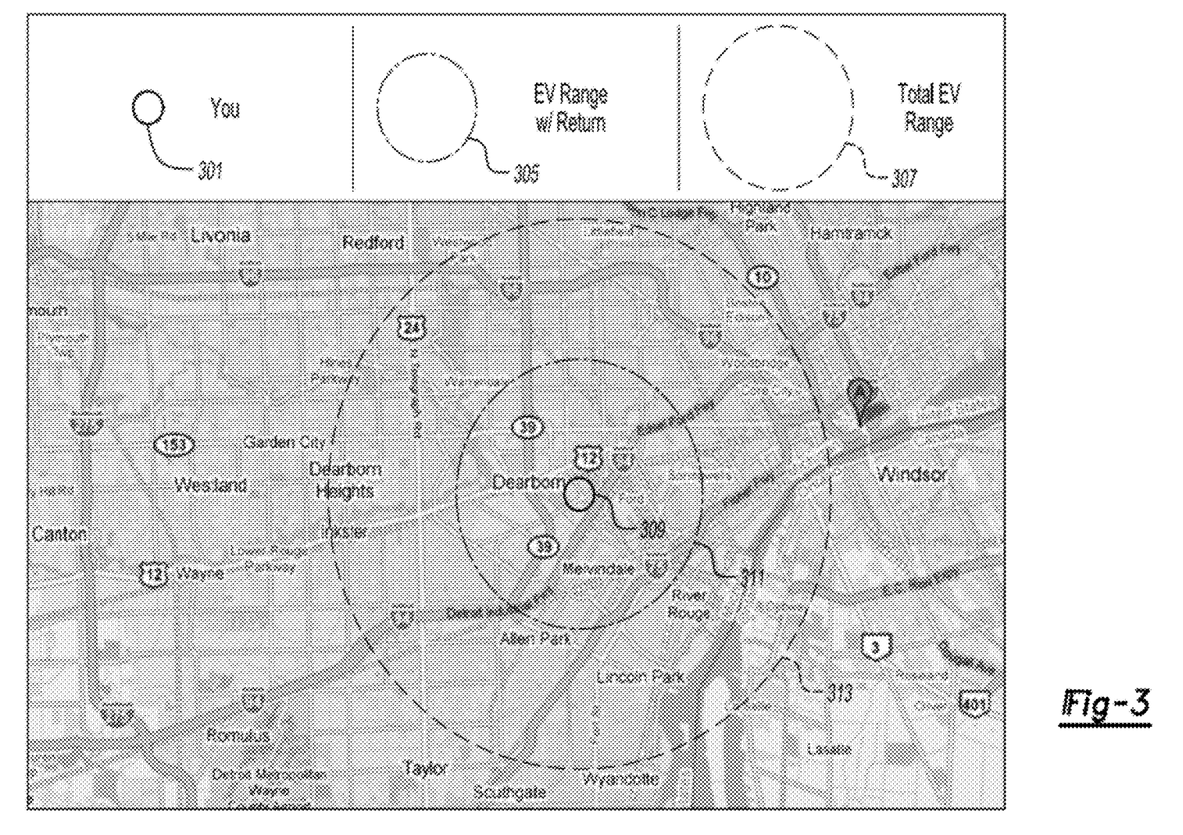
FIG. 3 shows an illustrative example for an EV, showing a present location, a total range, and a current range with return.

FIG. 3 shows an illustrative example for an EV, showing a present location, a total range, and a current range with return.

In this illustrative example, the display system has determined (or has been provided with) a maximum range for the EV, based on a current level of charge. This maximum range is then graphically displayed as a map overlay. A key shows the designations for the vehicle 301, the range with return 305, and the total EV range 307.

On the map overlay, these designations are also shown. As can be seen in FIG. 3, a small indicator 309 marks the present location of the vehicle. A medium dashed circle 311 marks the EV Range with Return, based on the current charge. A large dashed circle 313 marks the maximum current range of the vehicle, based on the current charge.

Half-way (or approximately half-way) between the vehicle's current location and the maximum range boundary, a second dashed line shows the current maximum range if the user also desires to return to the starting location.

This useful display of information can allow a vehicle driver to easily and quickly verify if they can either reach a destination where a recharge is possible (e.g., without limitation, any point within the maximum range) or if they can drive to a destination and then return (e.g., without limitation, any point within the EV Range w/Return).

Figure 4:
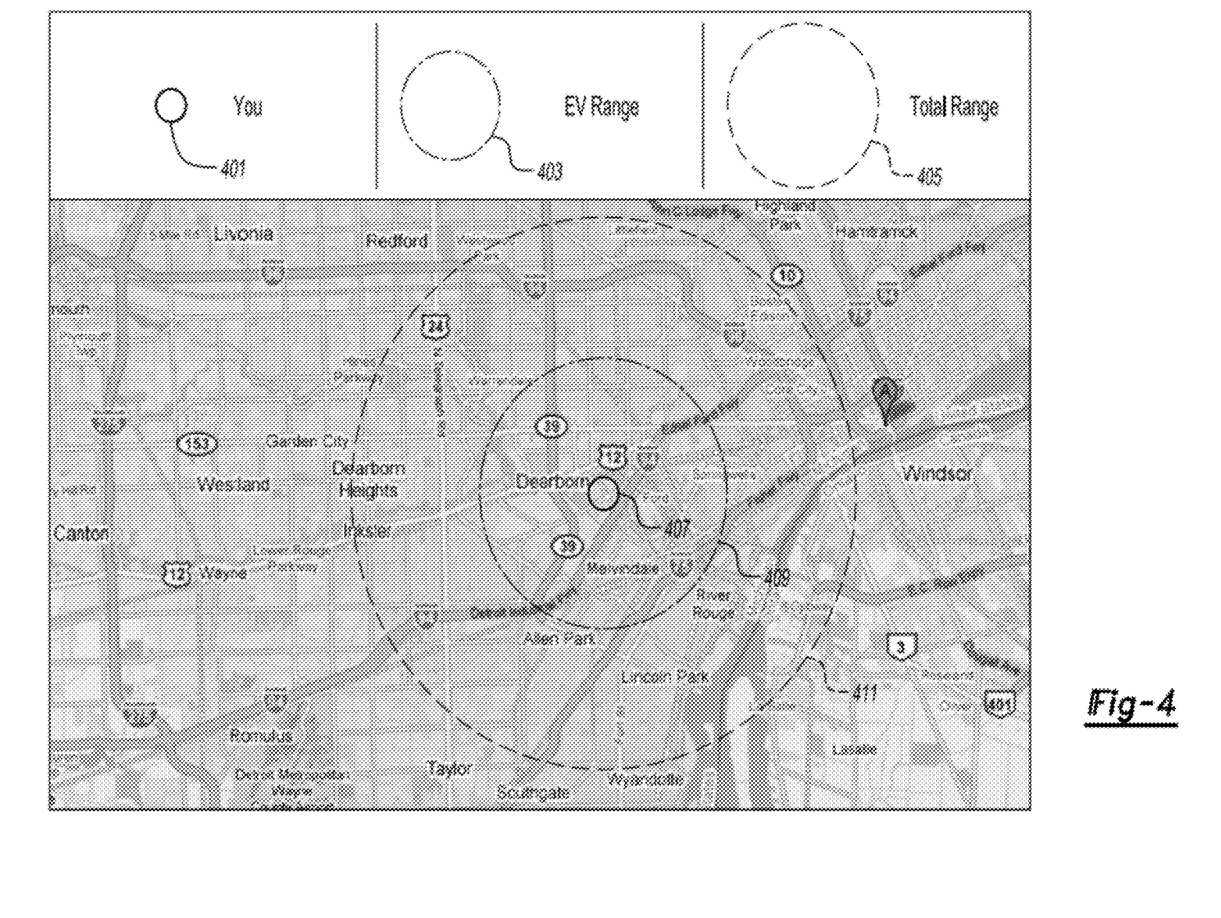
FIG. 4 shows a fuel boundary determination for an HEV.

A second illustrative display, shown in FIG. 4, shows a determination for an HEV. In this illustrative embodiment, a key again shows that designations are made for a user 401, EV range 403, and total range 405.

In this embodiment, the EV range 403, shown as circle 409 overlaid on the map, is the distance the user can go without switching to gasoline power. So, for example, if the user desires to run on electricity as much as possible, the user can easily see what destinations can be reached running solely or primarily on electricity At the same time, the vehicle also has gasoline capacity, and a maximum total range 405 is shown on the map as 411. This is the range achievable, from the user's current location 407, by tapping out the electric and gasoline fuel supplies of the vehicle. Since there is a reasonable chance that a user will be able to find a gasoline refueling station, at a minimum, somewhere along their route, the user can easily, visually determine before what point along the route they need to stop for refueling.

Although not pictured, it would also be possible to display an "out and back" range on this map as well, although, as noted above, the presence of numerous gasoline refueling stations may make it more likely that the user has an easy refueling option at some point along a journey.

Figure 5:
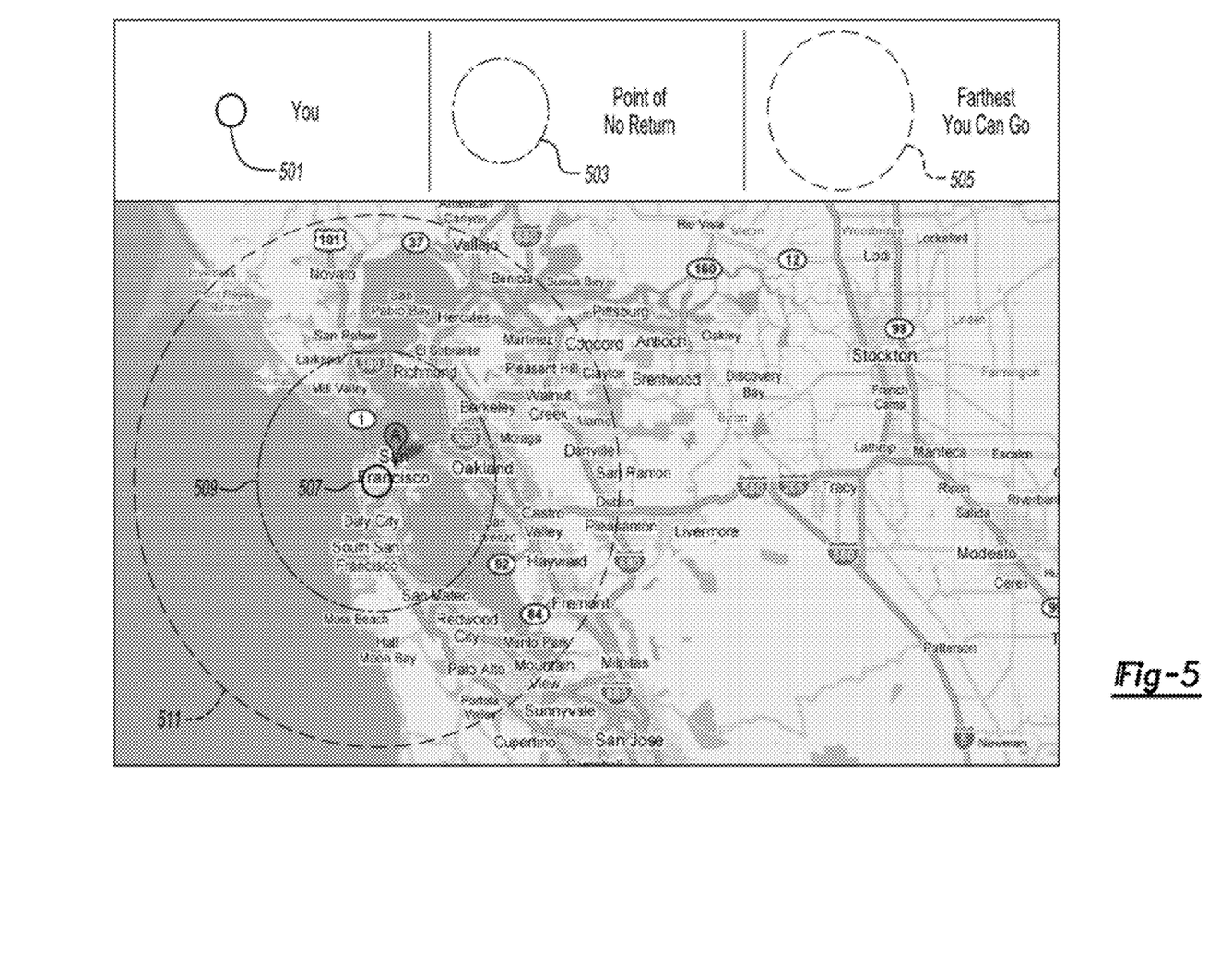
FIG. 5 shows an alternative means of displaying information similar to that displayed in FIG. 3.

FIG. 5 shows an alternative means of displaying information similar to that displayed in FIG. 3. In this illustrative example, a legend shows that the innermost point 501 of a range display is the user, an intermediate point can be recognized as the "point of no return" 503, and the maximum range is the farthest a user can go 505.

Again, the overlay on the map shows the present location of the user's vehicle at point 507. Halfway to the maximum range, a designation of the "point of no return is made." Assuming the user cannot stop and refuel the vehicle, once this point is passed, more than half of the currently remaining charge will have been presumably consumed, and thus the user will be unable to return over a greater distance than that designated by this line. Accordingly, unless the user knows of a refueling point between the boundary designated by line 509 and that designated by line 511 (the farthest the vehicle can go), it is unadvisable for the user to travel past this boundary.

Although the display of ranges has been discussed with respect to general determinations based on pre-defined vehicle specifications, it may be possible for more refined calculations to be employed.

For example, FIG. 6 shows an exemplary determination that takes into consideration what type of driving will exclusively or primarily be performed. In this illustrative embodiment, the determination system may determine a maximum distance a user may be able to travel on surface roads 601. The system may also determine a maximum distance a user may be able to travel on highways (where fuel efficiency is typically different from that of surface roads) 603.

Then, in this illustrative embodiment, the determination engine may check to see if an incoming display request is a surface road display request 605 or a highway display request 609. Depending on the type of display request, the system may be capable of displaying a range on surface roads 607 or on highways 611.

Alternatively or additionally, the system may display both types of ranges (for different road types) and/or the system may be capable of displaying a blended average incorporating some input, or pre-defined combination of road types indicative of a specific or typical drive for a user.

Figures 7, 8:
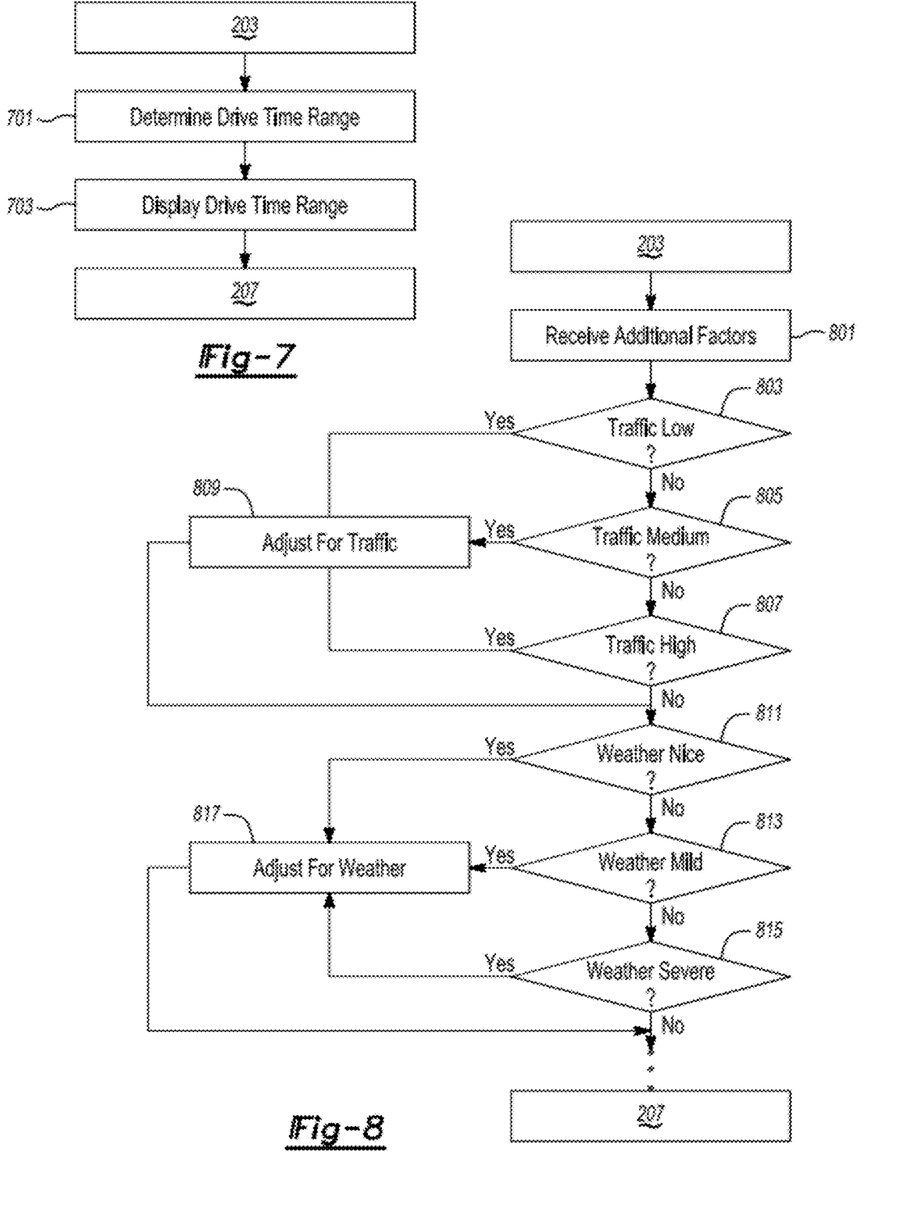
FIG. 7 shows an illustrative example of a determination for calculating and displaying maximum drive time.
FIG. 8 shows an illustrative example of additional adjustments that may be made to a calculation based on factors that may impact fuel efficiency.

FIG. 7 shows an illustrative example of a determination for calculating and displaying maximum drive time. It may be the case that efficiency for a vehicle is measured or measurable in terms of power usage over time. In an instance such as this, based on a predefined number for a vehicle model, or a known number for a specific vehicle, it may be possible to determine how long a vehicle can run on a current charge. Thus, it may be useful to display this information as well.

In this illustrative example, the determination engine calculates a drive time range in much the same manner it calculated a maximum geographical range 701. The drive time range may then be displayed 703. It can be displayed as concentric circles (as with the geographic range, or in any other manner suitable). By having information such as this available, the user may know, given, for example, a time of day, how long reaching a certain physical location should likely take. The user can then better determine whether or not it is possible to reach that location on the current charge.

FIG. 8 shows an illustrative example of additional adjustments that may be made to a calculation based on factors that may impact fuel efficiency. Although traffic and weather are used as illustrative examples here, they are for illustrative purposes only, and are not intended to limit the scope of the invention thereto.

In this exemplary embodiment, one or more additional factors are input into the decision engine 801. In this embodiment, those factors include, but are not limited, to, a traffic level and a weather condition.

Although the traffic levels and weather conditions are shown as three exemplary levels each, this is simply one exemplary manner of approaching this determination and is not intended to limit the use of traffic and/or weather data to such a three-tiered striation.

In this embodiment, based on a traffic input provided at 801, the system determines if a low 803, medium 805 or high 807 level of traffic exists for a given range over which a determination is to be made. Since traffic may vary greatly, it may be useful to generally characterize traffic based on, for example, but not limited to, time of day and day of week. That is, at 9:00 AM on a Monday, in an urban area, traffic may fairly be characterized as "high" whereas at 3:00 PM on a Sunday, in a rural area, traffic may generally be characterized as "low."

Generalizations such as this may be used, or actual traffic data can be evaluated and a determination can be made based on real data, or an aggregate of real data.

If a level of traffic for which an adjustment should be made exists, the system adjusts the determined ranges based on the traffic 809 and then checks for any other remaining factors.

In this illustrative embodiment, weather is also considered as a factor, so the system checks a weather report (or other input data source) to determine if the weather is "nice" 811, "mild" 813, or "severe" 815. Again, as with the traffic, much more specific data could be considered, such as temperature, precipitation levels, etc., although in this embodiment only three generalized levels of weather are examined by way of example.

If an adjustment needs to be made based on a known weather level, the adjustment is calculated 817 and the system then processes any other additional augmentation factors that may have been input.

Addition of factors that may impact drive time allows the system to more accurately portray a potential range based on current charge, and may provide the driver with additional decision making capability.

Figure 9:
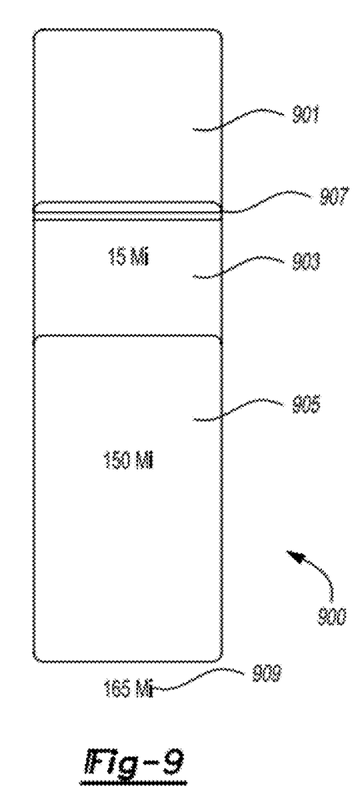
FIG. 9 shows an illustrative example of a gauge for an HEV.

FIG. 9 shows an illustrative example of a gauge for an HEV. In this illustrative embodiment, the gauge 900 may be displayed in addition to or in alternative to a map-ring type display.

In this embodiment, the gauge shows a fuel range remaining 905. This is an approximated total range remaining using fuel. This meter does not incorporate EV range, which is instead incorporated (in this embodiment) in a second meter 903 displayed as part of the gauge. The gauge also shows a total vehicle range 909, incorporating both the fuel range remaining and the EV range.

In this example, a bar 907 represents the amount of EV power required to travel to a destination and return. So, for example, in this instance it may require roughly 14 miles worth of electric power to travel to a destination and return.

In this embodiment, if gasoline is required in addition to electric power, and indication may be provided to a driver that more than electric power may be used. This can be done in a number of suitable manners, including, but not limited to, moving the indicator bar down to the fuel portion of the gauge, placing a second bar on the fuel portion of the gauge, etc.

If the indicator bar is in the blank area 901, then it indicated that an estimated trip exceeds the desired total range available between gas and electric power. In an instance such as this, the driver may preserve some electric power by strategic power usage, and the gauge may show an indication showing whether a destination is possible, unlikely, impossible, etc., based on a current fuel level and state of charge.

This is but one non-limiting example of a fuel gauge suitable for implementation with the illustrative embodiments, and is provided for exemplary purposes only.

Figure 10:
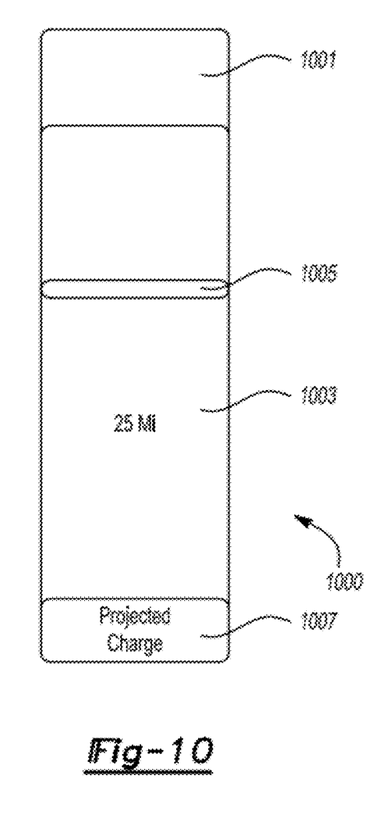
FIG. 10 shows an illustrative example of a gauge for a Battery Electric Vehicle (BEV).

FIG. 10 shows an illustrative example of a gauge for a BEV. In this illustrative example, the car has no secondary gasoline fuel source. A blank area 1001 shows power already used (the gauge 1000 represents a full charge when full).

A second area 1003 shows total power remaining. The indicator bar 1005 shows how much of the remaining power will be used. If the bar is in the blank area, then it may be unlikely or impossible for the vehicle to reach a destination using the remaining power.

Section 1007 shows a projected state of charge (SOC) at the completion of a journey. This portion can change color based on whether or not a destination is likely to be reached with a reasonable, almost empty, likely empty state, etc.

Although the bar 1005 in this example rises as more power is likely to be consumed, it would also be possible for the bar to drop as power is likely to be consumed, thus indicating a likely finishing level for the blank area 1001 when a trip is completed. Thus, in such an instance, if the bar is at the bottom of the area 1003, then the driver knows that it is unlikely that sufficient power remains to complete the trip.

Also, in this example, the bar represents a round-trip, from a starting point to a destination and back. It is also possible that the bar could simply represent a projected charge remaining in one direction of the trip.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
   calculating projected charge and gasoline usage for a predefined trip;
   displaying a stacked bar gauge including both charge and gasoline expected maximum remaining-range, calculated based on historic user travel data and displayed as independent stacked bar components, such that they aggregate to a maximum remaining vehicle range, of a single gauge that, includes an indicator, visually indicating the projected charge and gasoline usage as portions of displayed charge or gasoline remaining-range.

2. The method of claim 1, wherein the displaying is performed by a vehicle navigation display.

3. The method of claim 1, wherein the displaying is performed by a remote personal computer.

4. The method of claim 1, wherein the displaying is performed by a nomadic wireless device.

5. The method of claim 1, wherein the maximum remaining vehicle range is also based on one or more current weather conditions.

6. The method of claim 1, wherein the maximum remaining vehicle range is also based on one or more current traffic conditions.

7. The method of claim 1, further comprising:
   calculating a maximum remaining vehicle travel-time based on at least one of a current level of charge or a total power usage; and
   displaying the maximum remaining travel-time on the display.

8. The method of claim 1, wherein if both gasoline and charge are projected to be required to complete the predefined trip, separate indicators are displayed as part of the gauge indicating what portion of each of the gasoline and charge remaining distance components of the gauge will be used up to complete the predefined trip.

* * * * *